(12) United States Patent
Lin et al.

(10) Patent No.: US 9,973,118 B2
(45) Date of Patent: May 15, 2018

(54) MOTOR DRIVE CIRCUIT, METHOD FOR DETECTING SINGLE PHASE DC MOTOR ROTATION DIRECTION AND METHOD FOR STARTING MOTOR

(71) Applicant: DELTA ELECTRONICS, INC., Taoyuan (TW)

(72) Inventors: Yu-Liang Lin, Taoyuan (TW); Chung-Hung Tang, Taoyuan (TW); Cheng-Chieh Liu, Taoyuan (TW); Chien-Sheng Lin, Taoyuan (TW); Chun-Lung Chiu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 36 days.

(21) Appl. No.: 14/831,461

(22) Filed: Aug. 20, 2015

(65) Prior Publication Data

US 2016/0087559 A1    Mar. 24, 2016

(30) Foreign Application Priority Data

Sep. 22, 2014   (TW) .............................. 103132564 A (51) Int. Cl.
*H02P 1/00*       (2006.01)
*H02P 6/00*       (2016.01)
(Continued)

(52) U.S. Cl.
CPC ............. *H02P 6/008* (2013.01); *G01D 5/145* (2013.01); *H02P 6/182* (2013.01); *H02P 6/20* (2013.01)

(58) Field of Classification Search
CPC .. H02P 6/182; H02P 6/085; H02P 6/20; H02P 6/22; H02P 6/16; H02P 1/22; H02P 23/24; H02P 6/26; G01D 5/142
(Continued)

(56) References Cited

U.S. PATENT DOCUMENTS 5,598,071 A * 1/1997 Dunfield ................ H02K 29/03
                                                        318/400.11
6,046,554 A * 4/2000 Becerra ..................... H02P 6/34
                                                        318/400.34
(Continued)

FOREIGN PATENT DOCUMENTS

CN       103199778        7/2013
TW       M304845          1/2007
(Continued)

*Primary Examiner* — Bentsu Ro
*Assistant Examiner* — Thai Dinh
(74) *Attorney, Agent, or Firm* — Hauptman Ham, LLP (57) ABSTRACT

A motor drive circuit including a back electromotive force detecting module and a processing module is disclosed herein. The back electromotive force detecting module is electrically connected to a single phase DC motor and is configured to detect a back electromotive force of the single phase DC motor and to output a detecting signal correspondingly. The processing module is electrically connected to the back electromotive force detecting module and the single phase DC motor. The processing module is configured to determine the rotation direction of the single phase DC motor according to the detecting signal and a hall signal outputted by a hall element located in the single phase DC motor, and is configured to control the single phase DC motor.

16 Claims, 7 Drawing Sheets

(51) Int. Cl.
*H02P 6/182* (2016.01)
*H02P 6/20* (2016.01)
*G01D 5/14* (2006.01)

(58) Field of Classification Search
USPC ................. 318/490, 400.26, 400.34, 400.38
See application file for complete search history.

(56) References Cited

U.S. PATENT DOCUMENTS

| | | | |
|---|---|---|---|
| 7,495,402 B2 | 2/2009 | Lee | |
| 8,853,980 B2* | 10/2014 | Chang | H02P 6/008 318/400.01 |
| 2004/0217724 A1* | 11/2004 | Nagasawa | H02P 7/05 318/280 |
| 2010/0254685 A1* | 10/2010 | Dai | G01D 1/00 388/801 |
| 2012/0068642 A1 | 3/2012 | Chen et al. | |
| 2013/0002180 A1 | 1/2013 | Murata | |
| 2014/0368139 A1* | 12/2014 | Zhou | H02P 6/182 318/400.13 |

FOREIGN PATENT DOCUMENTS

| | | |
|---|---|---|
| TW | 200950274 | 12/2009 |
| TW | 201203835 | 1/2012 |
| TW | 201210175 | 3/2012 |
| TW | 201306443 | 2/2013 |

\* cited by examiner

MOTOR DRIVE CIRCUIT, METHOD FOR DETECTING SINGLE PHASE DC MOTOR ROTATION DIRECTION AND METHOD FOR STARTING MOTOR

RELATED APPLICATIONS

This application claims priority to Taiwan Application Serial Number 103132564, filed Sep. 22, 2014, which is herein incorporated by reference.

BACKGROUND

Technical Field

The present disclosure relates to a motor drive circuit. More particularly, the present disclosure relates to a single phase DC motor drive circuit.

Description of Related Art

Typically, when starting a fan motor, if the fan is in a reverse direction due to the fact that the return wind in the system is too strong, an overcurrent situation is encountered and burns out inner elements of the fan because the motor cannot be brought back to the forward direction after being started and power accumulates. Therefore, determining whether a rotor of the motor is in the reverse direction and performing control correspondingly is an important issue in the field.

In the past, determining the rotation direction of a single phase DC motor was performed through two Hall elements located at different angles of the motor rotor and by utilizing the Hall Effect. By comparing the time sequences of the signals of the two Hall elements, the rotation direction could be determined. When using such a method to perform rotation direction determination, it is necessary to install at least two Hall elements in the DC motor, and a plurality of pins are also needed to connect the Hall elements in the control circuit. The design is both complicated and inconvenient.

SUMMARY

One aspect of the present disclosure is a motor drive circuit. According to an embodiment of the present disclosure, the motor drive circuit includes a back electromotive force detecting module and a processing module. The back electromotive force detecting module is electrically connected to a single phase DC motor, and is configured to detect a back electromotive force of the single phase DC motor and to output a detecting signal correspondingly. The processing module is electrically connected to the back electromotive force detecting module and the single phase DC motor, and is configured to determine the rotation direction of the single phase DC motor according to the detecting signal, a reference level, and a hall signal outputted by a hall element disposed in the single phase DC motor, and to control the single phase DC motor.

Another aspect of the present disclosure is a method for determining the rotation direction of the single phase DC motor. The method includes detecting the back electromotive force of the single phase DC motor and outputting the detecting signal correspondingly; receiving the hall signal outputted by the hall element disposed in the single phase DC motor; and determining the rotation direction of the single phase DC motor according to the detecting signal, the reference level, and the hall signal.

Yet another aspect of the present disclosure is a method for starting a motor applying the aforementioned determination of the rotation direction. The method includes determining whether the single phase DC motor is dynamic according to the hall signal outputted by the hall element disposed in the single phase DC motor; when the single phase DC motor is determined to be stationary, activating the single phase DC motor directly; when the single phase DC motor is determined to be dynamic, determining the rotation direction of the single phase DC motor according to the detecting signal, the reference level, and the hall signal, in which the detecting signal corresponds to the back electromotive force of the single phase DC motor; and controlling the single phase DC motor according to the rotation direction of the single phase DC motor.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Reference will now be made in detail to embodiments of the present disclosure, examples of which are described herein and illustrated in the accompanying drawings. While the disclosure will be described in conjunction with embodiments, it will be understood that they are not intended to limit the invention to these embodiments. On the contrary, the invention is intended to cover alternatives, modifications and equivalents, which may be included within the spirit and scope of the disclosure as defined by the appended claims. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

The terms "about" and "approximately" in the disclosure are used as equivalents. Any numerals used in this disclosure with or without "about," "approximately," etc. are meant to cover any normal fluctuations appreciated by one of ordinary skill in the relevant art. In certain embodiments, the term "approximately" or "about" refers to a range of values that fall within 20%, 10%, 5%, or less in either direction (greater or less than) of the stated reference value unless otherwise stated or otherwise evident from the context.

In the following description and in the claims, the terms "include" and "comprise" are used in an open-ended fashion, and thus should be interpreted to mean "include, but not limited to." As used herein, the term "and/or" includes any and all combinations of one or more of the associated listed items.

In this document, the term "coupled" may also be termed "electrically coupled," and the term "connected" may be termed "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Figure 1:
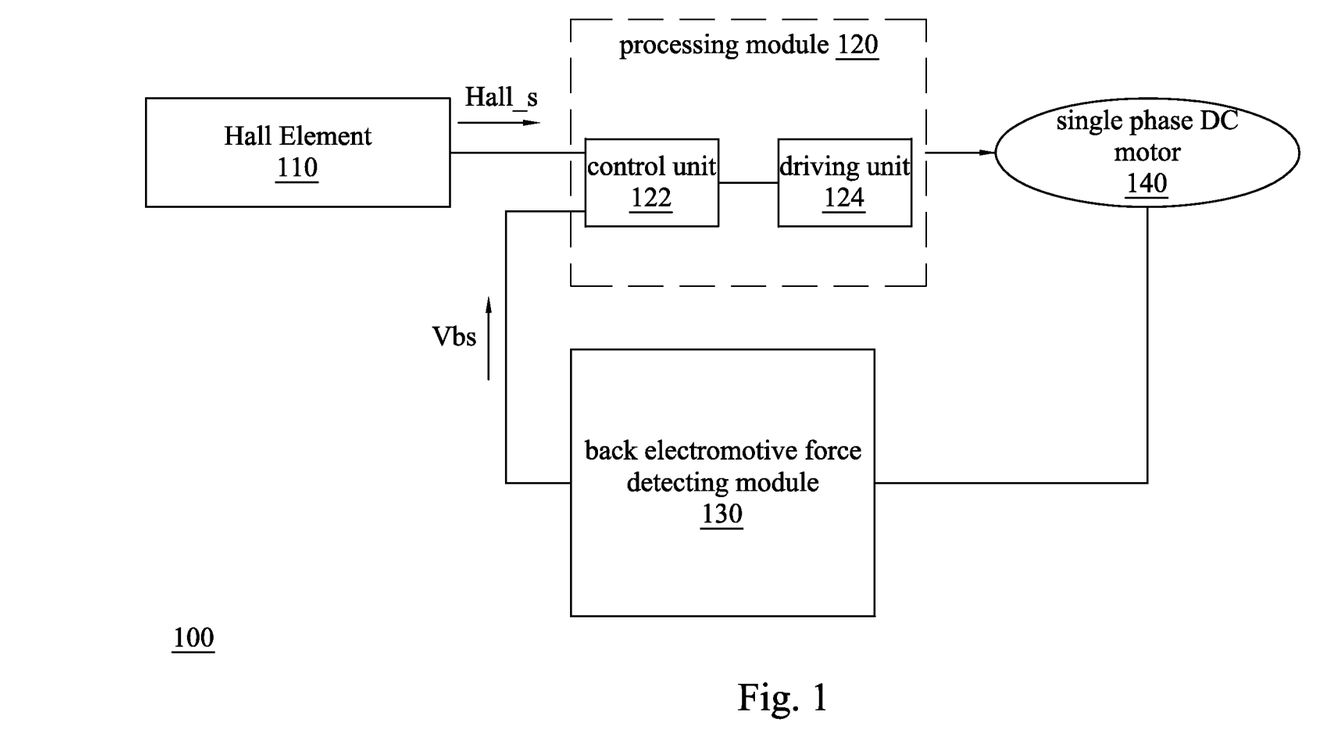
FIG. 1 is a block diagram illustrating a drive circuit according to an embodiment of the present disclosure.

One aspect of the present disclosure is a motor drive circuit. Reference is made to FIG. 1. FIG. 1 is a block diagram illustrating a drive circuit 100 according to an embodiment of the present disclosure. The drive circuit 100 includes a processing module 120 and a back electromotive force detecting module 130. The processing module 120 is electrically connected to the back electromotive force detecting module 130 and a single phase DC motor 140. The back electromotive force detecting module 130 is electrically connected to the single phase DC motor 140.

A hall element 110 is disposed or located on a stator of the single phase DC motor 140 (for convenience of explanation, the hall element 110 is illustrated independently outside the single phase DC motor 140 in FIG. 1). When a magnetic field perpendicular to the direction of a current is applied to a conductor, electrons in the conductor experience the Lorentz force and accumulate. An electric field, which is called the Hall Effect, is established at this time, and the voltage generated is called a Hall voltage. When the single phase DC motor 140 rotates, the hall element 110 is configured to detect the changes in the magnetic field present and output a hall signal Hall_s correspondingly.

When the single phase DC motor 140 is driven to rotate, the voltage generated in a coil of the motor is called a back electromotive force (back-EMF, or counter-electromotive force). The back electromotive force detecting module 130 is electrically connected to the single phase DC motor 140, and is configured to detect the back electromotive force Vb of the single phase DC motor 140 and to output the detecting signal Vbs correspondingly. For example, the detecting signal Vbs may be determined according to the back electromotive force Vb. In an embodiment of the present disclosure, when the back electromotive force Vb detected by the back electromotive force detecting module 130 is a positive value, the back electromotive force detecting module 130 is configured to output the detecting signal Vbs with a first level (e.g., high level). When the back electromotive force Vb detected by the back electromotive force detecting module 130 is a negative value, the back electromotive force detecting module 130 is configured to output the detecting signal Vbs with a second level (e.g., low level).

Thus, the processing module 120 is able to determine the rotation direction of the single phase DC motor 140 according to the hall signal Hall_s transmitted from the hall element 110, the detecting signal Vbs transmitted from the hall element 110 and a reference level, and to control the single phase DC motor accordingly.

In some embodiments, as shown in FIG. 1, the processing module 120 includes a control unit 122 and a driving unit 124. The control unit 122 is configured to compare the level of the detecting signal Vbs with the reference level when the hall signal Hall_s outputted by the hall element 110 has a detecting level (e.g., a high level), in order to determine the rotation direction of the single phase DC motor 140. The driving unit 124 is configured to drive the single phase DC motor 140 selectively according to the determination result of the control unit 122.

Figure 2:
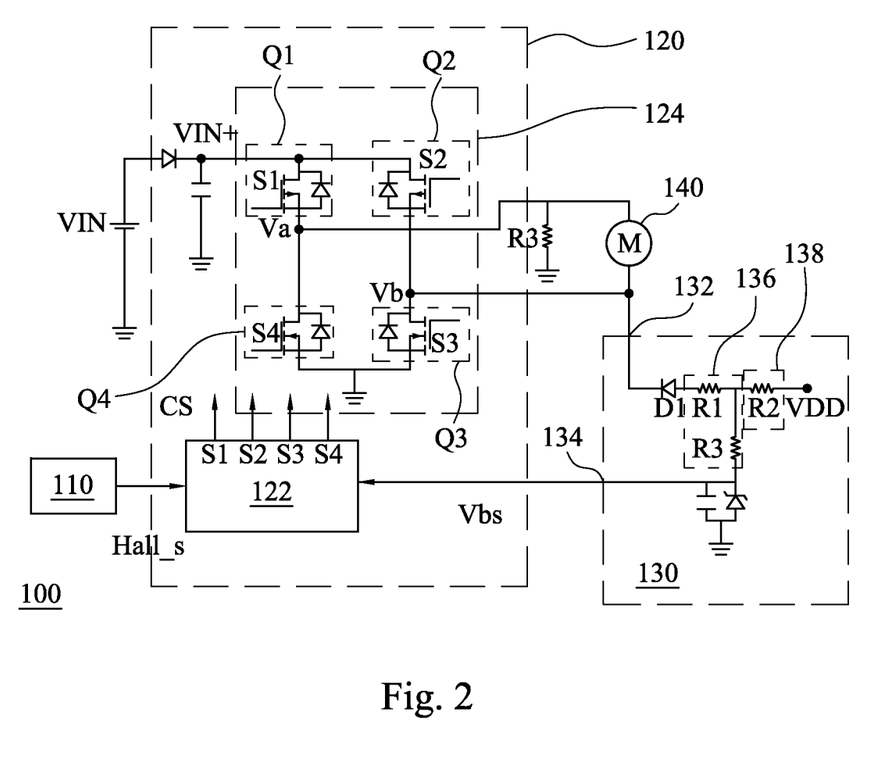
FIG. 2 is a circuit diagram illustrating the drive circuit according to an embodiment of the present disclosure.

Reference is made to FIG. 2. FIG. 2 is a circuit diagram illustrating the drive circuit 100 according to an embodiment of the present disclosure.

In the present embodiment, the back electromotive force detecting module 130 has an input terminal 132 and an output terminal 134, in which input terminal 132 is electrically connected to the single phase DC motor 140, and the output terminal 134 is electrically connected to the control unit 122. The back electromotive force detecting module 130 is configured to detect the back electromotive force Vb of the single phase DC motor 140 through the input terminal 132, and to output the detecting signal Vbs to the control unit 122 through the output terminal 134. The back electromotive force detecting module 130 includes a diode D1, a resistor unit 136 and a resistor unit 138. A first terminal (e.g., the cathode) of the diode D1 is electrically connected to the input terminal 132 of the back electromotive force detecting module 130. A first terminal of the resistor unit 136 is electrically connected to a second terminal (e.g., the anode) of the diode D1. A second terminal of the resistor unit 136 is electrically connected to the output terminal 134 of the back electromotive force detecting module 130. A first terminal of the resistor unit 138 is electrically connected to the resistor unit 136 and a second terminal of the resistor unit 138 is electrically connected to a voltage source VDD.

In an embodiment, as shown in FIG. 2, the resistor unit 136 may include a resistor R1 and a resistor R3 electrically connected to each other in parallel. The resistor unit 138 may include a resistor R2. In some embodiments, the resistor unit 136 and resistor unit 138 may include a plurality of resistors electrically connected in parallel or in series according to actual requirements.

In the present embodiment, when the back electromotive force Vb received by the input terminal 132 of the back electromotive force detecting module 130 is a positive value, the diode D1 is cut off due to the reverse bias, and thus the output terminal 134 of the back electromotive force detecting module 130 is configured to output the corresponding detecting signal Vbs having the first level (e.g., high level). When the back electromotive force Vb received by the input terminal 132 of the back electromotive force detecting module 130 is a negative value, the diode D1 is on due to the forward bias, and thus the output terminal 134 of the back electromotive force detecting module 130 is configured to output the corresponding detecting signal Vbs having the second level (e.g., low level). For example, if the resistor unit 136 and the resistor unit 138 have the same resistance, the level of the detecting signal Vbs will be half the level of the voltage source VDD. The value of the second level may be designed according to actual requirements by adjusting the resistance ratio of the resistor unit 136 and the resistor unit 138.

Figure 3A:
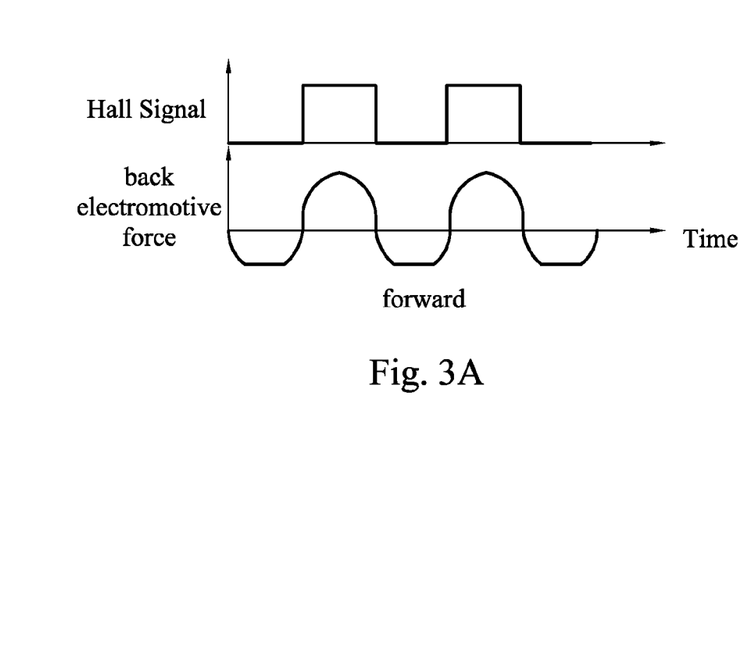
FIG. 3A and FIG. 3B are diagrams illustrating waveforms of a back electromotive force and a hall signal when a motor rotates in different directions according to an embodiment of the present disclosure.
Figure 3B:
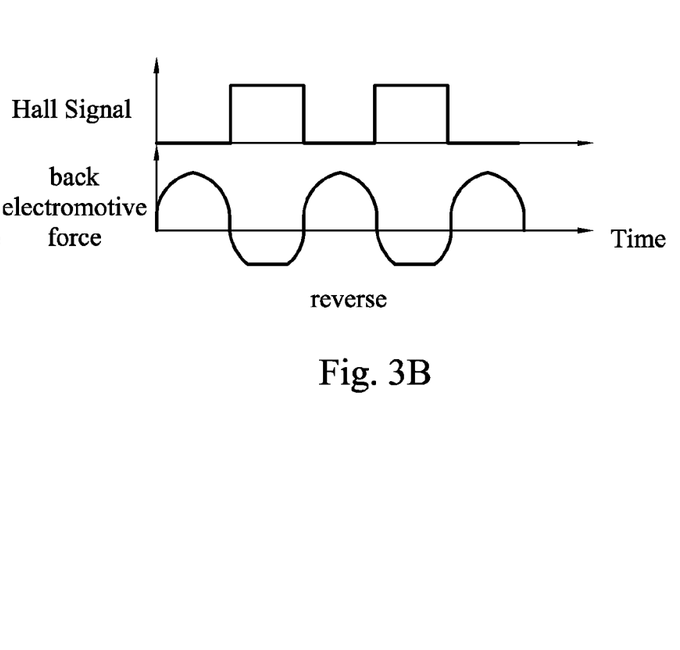

Reference is made to FIG. 3A and FIG. 3B. FIG. 3A is a diagram illustrating waveforms of the back electromotive force Vb and the hall signal Hall_s when the single phase DC motor 140 rotates in the forward direction according to an embodiment of the present disclosure. FIG. 3B is a diagram illustrating waveforms of the back electromotive force Vb and the hall signal Hall_s when the single phase DC motor rotates in the reverse direction according to an embodiment of the present disclosure. It is noted that the waveforms shown is FIG. 3A may also be those corresponding to when the motor rotates in the reverse direction and the waveforms shown is FIG. 3B may also be those corresponding to when the motor rotates in the forward direction.

As shown in FIG. 3A and FIG. 3B, the zero-crossing point of the back electromotive force Vb is also the positive edge or the negative edge of the hall signal Hall_s, and the characteristics of the waveform of the back electromotive force Vb are different when the motor rotates in the forward direction and in the reverse direction. Therefore, the relationship between the hall signal Hall_s and the back electromotive force Vb may be used to determine the rotation direction of the single phase DC motor 140.

According to FIG. 3A, when the single phase DC motor 140 rotates in the forward direction, the hall signal Hall_s outputted by the hall element 110 is in the same phase as the back electromotive force Vb. That is to say, in the forward direction, when the hall signal Hall_s has a high level, the back electromotive force Vb also has a high level, and when the hall signal Hall_s has a low level, the back electromotive force Vb also has a low level. In contrast, according to FIG. 3B, when the single phase DC motor 140 rotates in the reverse direction, the hall signal Hall_s outputted by the hall element 110 is in the opposite phase of the back electromotive force Vb. That is to say, in the reverse direction, when the hall signal Hall_s has a high level, the back electromotive force Vb has a low level, and when the hall signal Hall_s has a low level, the back electromotive force Vb has a high level. Therefore, when the hall signal Hall_s has a high level, the control unit 122 in the process module 120 may be configured to determine that the single phase DC motor 140 is in the forward direction or in the reverse direction according to the polarities of the back electromotive force Vb, and to control the driving unit 124 correspondingly based on the detected result. Specifically, the control unit 122 may be implemented by a microcontroller unit (MCU), a complex programmable logic device (CPLD), a field-programmable gate array (FPGA), etc.

However, in the system design, the signal level the control unit 122 is able to receive may not be the same as the level of the back electromotive force Vb; therefore, the aforementioned back electromotive force detecting module 130 is required, and is configured to transform the detected back electromotive force Vb and output a corresponding detecting signal Vbs for the control unit 122 to determine the rotation direction. The detecting signal Vbs outputted by the back electromotive detecting module 130 retains the phase characteristic of the back electromotive force Vb. When the back electromotive force Vb has a low level, the level of the detecting signal Vbs is lower than the reference level, and when the back electromotive force Vb has a high level, the level of the detecting signal Vbs is higher than the reference level.

Thus, the control unit 122 may be configured to compare the level of the detecting signal Vbs and the reference level when the hall signal Hall_s outputted by the hall element 110 has a detecting level (e.g., high level), and if the level of the detecting signal Vbs is higher than the reference level, the rotation direction of the single phase DC motor is determined to be forward. In contrast, when the level of the detecting signal Vbs is lower than the reference level, the rotation direction of the single phase DC motor is determined to be reverse. Thus, the control unit 122 may be configured to output the corresponding control signal CS to control the driving unit 124 to drive the single phase DC motor selectively according to the determined result.

The driving unit 124 may be implemented by intelligent power modules (IPMs). As shown in FIG. 2, in an embodiment, the driving unit 124 includes switches Q1, Q2, Q3, and Q4. The switches Q1, Q2, Q3, and Q4 are controlled by switch signals S1, S2, S3, and S4 respectively. The control unit 122 may be configured to control the operations of the switches Q1, Q2, Q3, and Q4 respectively by outputting a control signal CS including the switch signals S1, S2, S3 and S4, and thus to drive the single phase DC motor 140. For example, when the control unit 122 determines that the single phase DC motor 140 is in the reverse direction, the control unit 122 may be configured to output the control signal CS to cut off the switches Q1 and Q2, and to turn on the switches Q3 and Q4 in order to perform a brake control to the single phase DC motor 140. According to different designs of the driving unit 124, the control of the single phase DC motor 140 by the control signal CS may also be implemented in different ways, and the aforementioned examples are not meant to limit the present disclosure.

Therefore, by the comparison of the hall signal Hall_s and the detecting signal Vbs, the characteristic of the back electromotive force Vb of the single phase DC motor 140 during different rotation directions can be used to determine the rotation direction of the single phase DC motor 140 and perform control.

Figure 4:
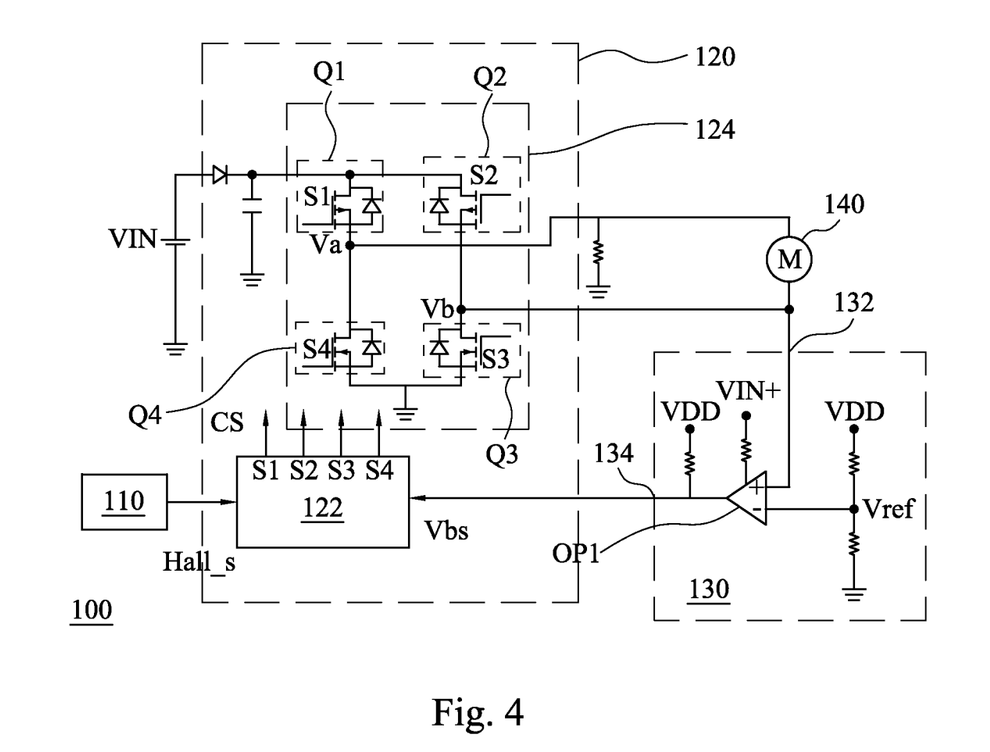
FIG. 4 is a circuit diagram illustrating the drive circuit according to another embodiment of the present disclosure.

The back electromotive force detecting module 130 may also be realized using a digital implementation through a comparator. Reference is made to FIG. 4. FIG. 4 is a circuit diagram illustrating the drive circuit according to another embodiment of the present disclosure. In the present embodiment, the back electromotive force detecting module 130 includes a comparator OP1. A first input terminal of the comparator OP1 is electrically connected to the input terminal 132 of the back electromotive force detecting module 130 and is configured to receive the back electromotive force Vb of the single phase DC motor 140. A second input terminal of the comparator OP1 is electrically connected to a reference voltage Vref. An output terminal of the comparator OP1 is electrically connected to the output terminal 134 of the back electromotive force detecting module 130 to output the detecting signal Vbs.

In the present embodiment, when the voltage level of the back electromotive force Vb of the single phase DC motor 140 is higher than the level of the reference voltage Vref, the comparator OP1 is configured to output the corresponding detecting signal Vbs having a first level (e.g., high level). In contrast, when the voltage level of the back electromotive force Vb of the single phase DC motor 140 is lower than the level of the reference voltage Vref, the comparator OP1 is configured to output the corresponding detecting signal Vbs having a second level (e.g., low level), in which the reference level Vref may be obtained by performing a voltage division with respect to a voltage source VDD through resistors connected in series.

In the present embodiment, the control unit 122 may also be configured to perform the determination according to the level of the detecting signal Vbs when the hall signal Hall_s outputted by the hall element 110 has a detecting level (e.g., high level), and to output the corresponding control signal CS according to the comparison result, in order to control the driving unit 124 to drive the single phase DC motor 140 selectively. Specific details of the comparison and control method are all well disclosed and illustrated in the above paragraphs, and thus a further explanation is omitted herein for the sake of brevity.

Figure 5:
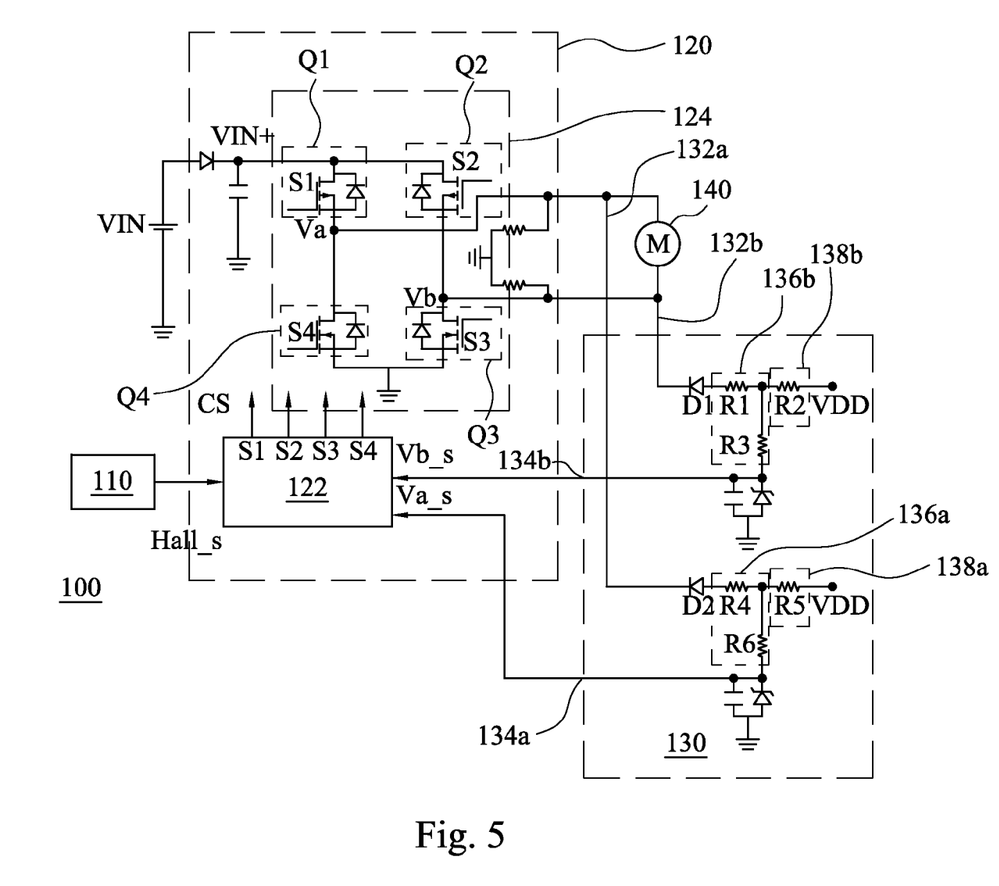
FIG. 5 is a circuit diagram illustrating the drive circuit according to yet another embodiment of the present disclosure.

In addition, the back electromotive force detecting module 130 may also be configured to detect two or more back electromotive forces Va and Vb and to output a plurality of detecting signals Vas and Vbs. Reference is made to FIG. 5. FIG. 5 is a circuit diagram illustrating the drive circuit according to yet another embodiment of the present disclosure.

In the present disclosure, the back electromotive force detecting module 130 has input terminals 132a and 132b, and output terminals 134a and 134b. The input terminals 132a and 132b are electrically connected to the single phase DC motor 140 respectively to receive two sets of back electromotive forces Va and Vb. The output terminals 134a and 134b are electrically connected to the control unit 122 and configured to output detecting signals Vas and Vbs, respectively.

In the present embodiment, the back electromotive force detecting module 130 includes a diode D1, and resistor units 136b and 138b. The first terminal (e.g., the cathode terminal) of the diode D1 is electrically connected to the input terminal 132b of the back electromotive force detecting module 130. The first terminal of the resistor unit 136b is electrically connected to the second terminal (e.g., the anode terminal) of the diode D1. The second terminal of the resistor unit 136b is electrically connected to the output terminal 134b of the back electromotive force detecting module 130. The first terminal of the resistor unit 138b is electrically connected to the resistor unit 136b. The second terminal of the resistor unit 138b is electrically connected to the voltage source VDD. Through the circuit structure, the output terminal 134b of the back electromotive force detecting module 130 is configured to output the detecting signal Vbs corresponding to the back electromotive force Vb of the single phase DC motor. Details of the structure and operation are all fully disclosed and described in the above paragraphs, and thus a further explanation is omitted herein for the sake of brevity.

In addition, the back electromotive force detecting module 130 further includes a diode D2, and resistor units 136a and 138a. The first terminal (e.g., the cathode terminal) of the diode D2 is electrically connected to the input terminal 132a of the back electromotive force detecting module 130. The first terminal of the resistor unit 136a is electrically connected to the second terminal (e.g., the anode terminal) of the diode D2. The second terminal of the resistor unit 136a is electrically connected to the output terminal 134a of the back electromotive force detecting module 130. The first terminal of the resistor unit 138a is electrically connected to the resistor unit 136a. The second terminal of the resistor unit 138a is electrically connected to the voltage source VDD. The connecting relationship among the diode D2, the resistor unit 136a and the resistor unit 138a is similar to the connecting relationship among the diode D1, the resistor unit 136b and the resistor unit 138b. Through the circuit structure, the output terminal 134a of the back electromotive force detecting module 130 is configured to output the detecting signal Vas corresponding to another back electromotive force Va of the single phase DC motor. Details of the structure and operation are all fully disclosed and described in the above paragraphs, and thus a further explanation is omitted herein for the sake of brevity.

In the present embodiment, the back electromotive force detecting module 130 may be configured to output two sets of the detecting signals Vas and Vbs. According to actual requirements, the control unit 122 may be configured to compare the levels of the detecting signals Vas and Vbs to the reference level respectively, and to output a corresponding control signal CS to control the driving unit 124 to drive the single phase DC motor 140 selectively according to the determined results.

In addition, the aforementioned two detecting signals Vas and Vbs may be implemented by two sets of analog circuits disclosed above, by two sets of digital circuits through comparators as disclosed in the above paragraphs, or by variations such as one analog circuit and one digital circuit. The aforementioned embodiments are only examples and are not meant to limit the present disclosure. It will be apparent to those skilled in the art that various modifications and variations using the waveform characteristics of the back electromotive force to transform detecting signals can be made to the structure of the present disclosure. For example, a filter circuit may be added to stabilize the detecting signal or a clamp circuit may be added to adjust the level of the detecting signal in the back electromotive force detecting module 130 in the aforementioned embodiments without departing from the scope or spirit of the disclosure.

In conclusion, through implementation of the aforementioned embodiments in the present disclosure, analog or digital circuits are used to determine the rotation direction of the single phase DC motor 140. Thus, the system design using a plurality of hall elements in the prior art is simplified, such that the number of pins used in the control unit and total cost are reduced.

Another aspect of the present disclosure is a method for determining the rotation direction of a single phase DC motor. For better understanding of the present disclosure, the following method is discussed in relation to the embodiment shown in FIG. 1, but is not limited thereto. In an embodiment, the method for determining the rotation direction of the single phase DC motor includes a number of steps as outlined below.

First, the back electromotive force Vb of the single phase DC motor 140 is detected and the detecting signal Vbs is outputted correspondingly. Next, the hall signal Hall_s outputted by the hall element 110 located in the single phase DC motor 140 is received. Finally, the rotation direction of the single phase DC motor 140 is determined according to the detecting signal Vbs and the hall signal Hall_s.

In some embodiments, the steps of outputting the detecting signal Vbs may further include some steps. Namely, when the back electromotive force Vb is positive, the detecting signal Vbs having a first level (e.g., high level) is outputted, and when the first back electromotive force Vb is negative, the detecting signal Vbs having a second level (e.g., low level) is outputted.

In some other embodiments, the steps of outputting the detecting signal Vbs may further include a number of steps. First, the back electromotive force Vb and the reference voltage signal Vref are compared. When the level of the back electromotive force Vb is higher than the level of the reference voltage signal Vref, the detecting signal Vbs having the first level (e.g., high level) is outputted. When the level of the back electromotive force Vb is lower than the level of the reference voltage signal Vref, the detecting signal Vbs having the second level (e.g., low level) is outputted.

In some embodiments, the method for determining the rotation direction of the single phase DC motor further includes detecting another back electromotive force Va of the single phase DC motor 140 and outputting the detecting signal Vas correspondingly, and determining the rotation direction of the single phase DC motor 140 according to the detecting signal Vas and the hall signal Hall_s.

Those skilled in the art can immediately understand how to perform the operations and functions of the method based on the drive circuit 100 in the embodiments described above, and thus a further explanation is omitted herein for the sake of brevity.

The above description includes exemplary operations, but the operations are not necessarily performed in the order described. The order of the operations disclosed in the present disclosure may be changed, or the operations may even be executed simultaneously or partially simultaneously as appropriate, in accordance with the spirit and scope of various embodiments of the present disclosure.

Figure 6:
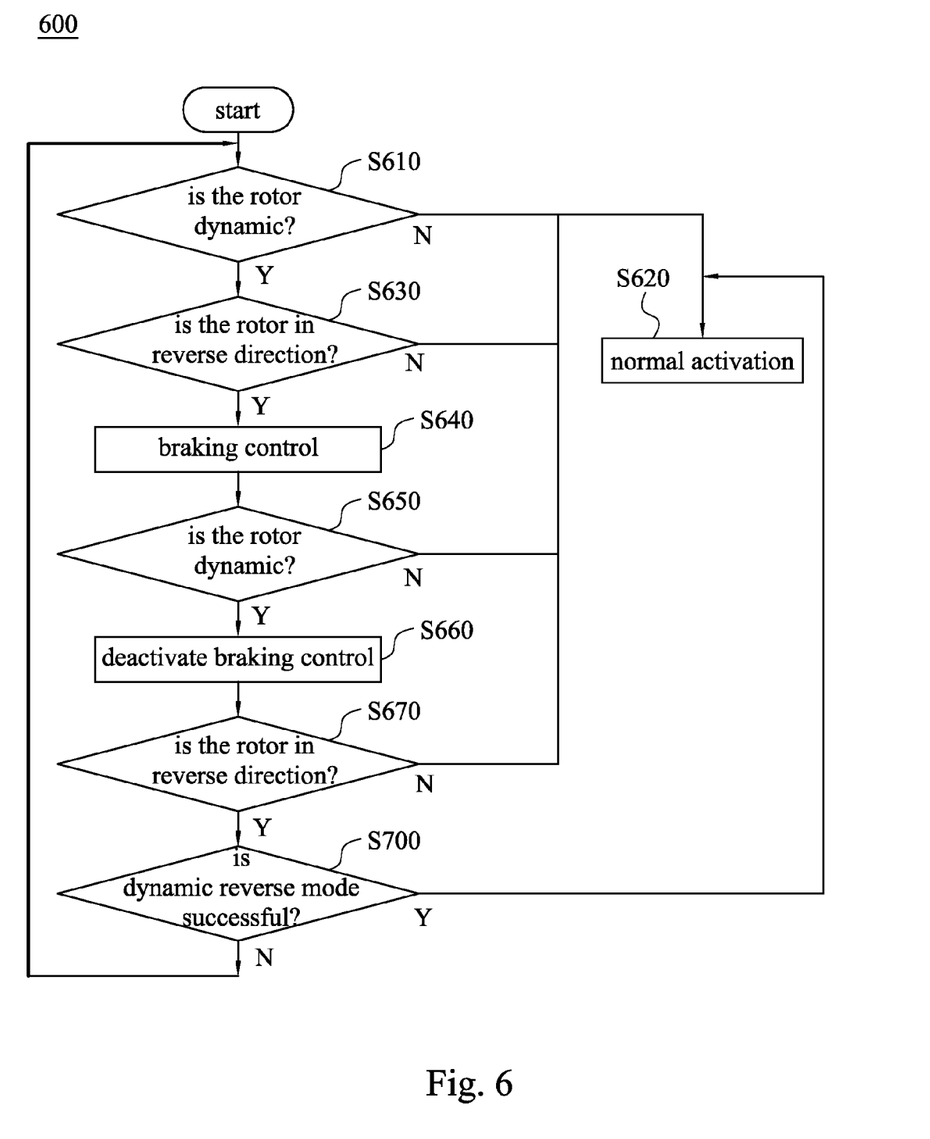
FIG. 6 is a flow chart illustrating a motor starting method according to an embodiment of the present disclosure.

Yet another aspect of the present disclosure is a method for starting a motor which applies rotation direction determination described above. Reference is made to FIG. 6. FIG. 6 is a flow chart illustrating a motor starting method 600 according to an embodiment of the present disclosure. For better understanding of the present disclosure, the following method is discussed in relation to the embodiment shown in FIG. 1, but is not limited thereto.

The motor starting method 600 includes steps S610, S620, S630, S640, S650, S660, S670, and S700. In the motor starting method 600, by applying the method for determining the rotation direction in the embodiments described above, the single phase DC motor 140 is controlled correspondingly and protected, and overcurrent, which causes burn out of the inner elements due to the reverse rotation of the single phase DC motor 140, is avoided when the motor is starting.

First, in step S610, whether a single phase DC motor is dynamic is determined according to the hall signal Hall_s outputted by the hall element 110 located in the single phase DC motor 140. Specifically, whether the rotor of the single phase DC motor 140 is dynamic can be determined according to the hall signal Hall_s outputted by the hall element 110 located in the single phase DC motor 140. Similarly, in the following paragraphs, whether the single phase DC motor 140 is dynamic, stationary, in the forward direction or in the reverse direction may indicate whether the rotor of the single phase DC motor 140 is dynamic, stationary, in the forward direction or in the reverse direction respectively in the embodiments of the present disclosure. If the single phase DC motor 140 is stationary, due to the fact that the magnetic field in the single phase DC motor is not changed, the hall signal Hall_s is not changed. In contrast, when the single phase DC motor 140 is dynamic, regardless of whether in the forward direction or the reverse direction, the periodic hall signal Hall_s is generated by the hall element 110 due to the changes in the magnetic field. Therefore, the control unit 122 is configured to determine whether the single phase DC motor 140 is dynamic according to the hall signal Hall_s.

When the single phase DC motor 140 is determined to be stationary, the single phase DC motor 140 can be activated safely without risk of causing overcurrent, and so step S620 is performed and the single phase DC motor 140 is activated directly. When the single phase DC motor 140 is determined to be dynamic, in step S630 the rotation direction of the single phase DC motor 140 is determined according to the detecting signal Vbs and hall signal Hall_s, in which the detecting signal Vbs corresponds to the back electromotive force Vb of the single phase DC motor 140. Details of the structure an operation are all fully disclosed and described in the above paragraphs, and thus a further explanation is omitted herein for the sake of brevity.

When the single phase DC motor 140 is determined to be in the forward direction, the single phase DC motor 140 can be activated safely without risk of causing overcurrent, and so step S620 is performed and the single phase DC motor 140 is activated directly. When the single phase DC motor 140 is determined to be in the reverse direction, in step S640, a corresponding control signal CS is outputted by the control unit 122 to control the driving unit 124 to perform a braking control with respect to the single phase DC motor 140. The braking control may be varied according to actual needs. For example, additional reference is made to FIG. 2. The control unit 122 may be configured to output the control signal CS to cut off the switches Q1 and Q2 and turn on the switches Q3 and Q4, and thus control the voltage of the single phase DC motor 140 to achieve the braking control.

In step S650, whether the single phase DC motor 140 is dynamic after performing the braking control with respect to the single phase DC motor 140 is determined. When the single phase DC motor 140 is determined to be stationary after performing the braking control, the single phase DC motor 140 can be activated safely without risk of causing overcurrent, and so step S620 is performed and the single phase DC motor 140 is activated directly. When the single phase DC motor 140 is still determined to be dynamic after performing the braking control, in step S660, the braking control is deactivated, and in step S670, the rotation direction of the single phase DC motor 140 is once again determined according to the detecting signal Vbs and the hall signal Hall_s. Similarly, when the single phase DC motor 140 is determined to be in the forward direction, the single phase DC motor 140 can be activated safely without risk of causing overcurrent, and so step S620 is performed and the single phase DC motor 140 is activated directly.

In steps S610-S670 described above, the control unit 122 is configured to check the rotation direction of the single phase DC motor 140 several times by using the method for determining the rotation direction of the single phase DC motor mentioned in the above embodiments in the present disclosure. In the current stage, if the single phase DC motor 140 is stationary or in the forward direction, the single phase DC motor 140 can be activated without risk of burning out elements, and so the control unit 122 may be configured to output a corresponding control signal CS to activate the single phase DC motor directly.

In contrast, in step S670, when the single phase DC motor 140 is determined to be in the reverse direction for the second time, in order to avoid an overcurrent from causing burn out of the inner elements when starting, step S700 is performed to control the single phase DC motor 140 in a dynamic reverse mode. If the single phase DC motor 140 can be brought back to the forward direction in the dynamic reverse mode in step S700, step S620 is performed similarly and the single phase DC motor 140 is activated directly. If the single phase DC motor 140 cannot be brought back to the forward direction in the dynamic reverse mode in step S700, the current activation process is terminated and the process is brought back to the initial state to try activating the single phase DC motor 140 once again.

Figure 7:
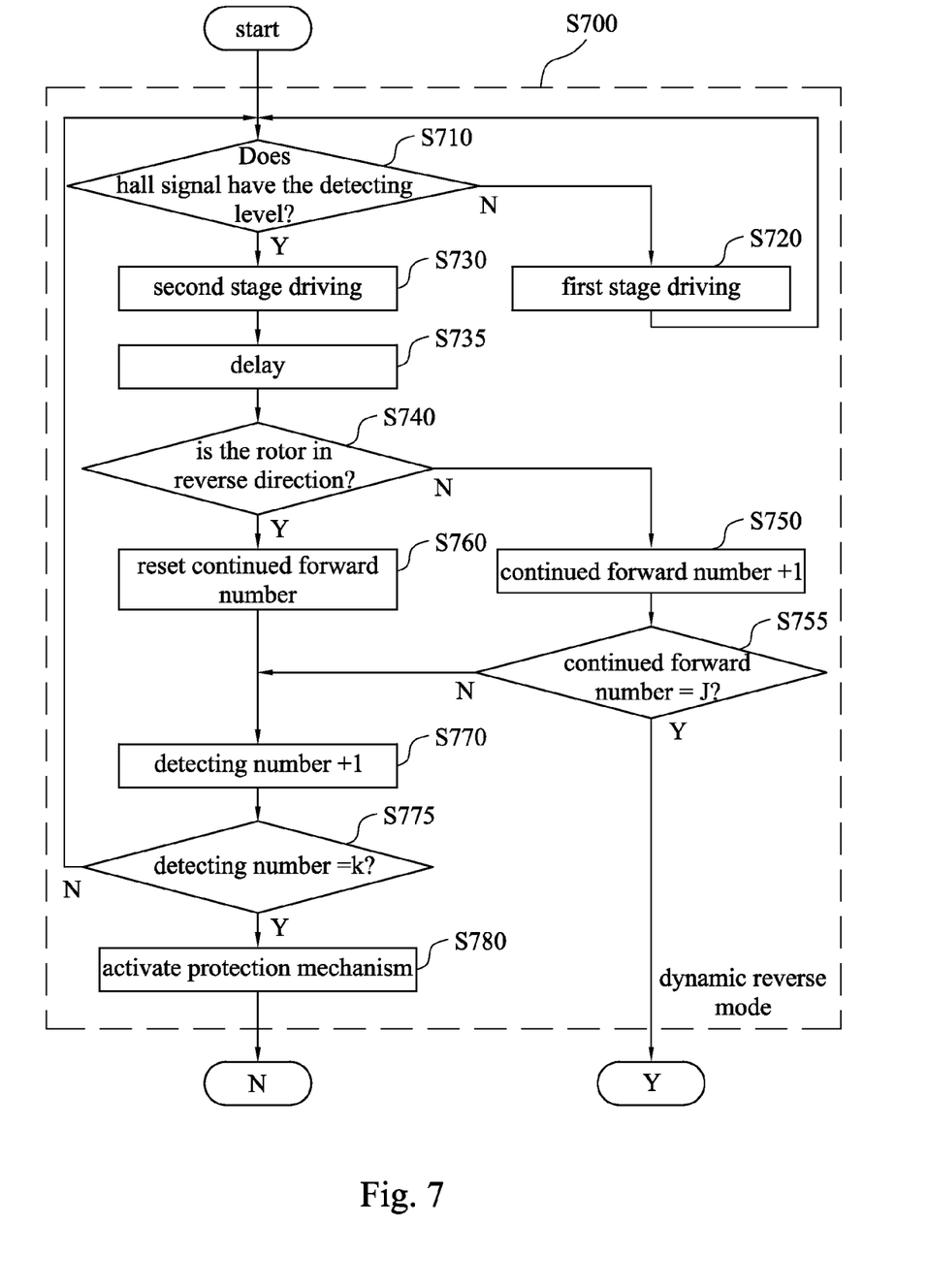
FIG. 7 is a flow chart illustrating the details of a dynamic reverse mode according to an embodiment of the present disclosure.

Specifically, reference is made to FIG. 7 for the details in the dynamic reverse mode in step S700. FIG. 7 is a flow chart illustrating the details in the dynamic reverse mode (i.e., step S700) according to an embodiment of the present disclosure. Step S700 further includes steps S710, S720, S730, S740, S750, S755, S760, S770, S775, and S780.

First, in step S710, whether the hall signal Hall_s has the detecting level (e.g., high level) is determined. When the hall signal Hall_s does not have the detecting level, in step S720, the control unit 122 is configured to drive the driving unit 124 performing in a first stage to control the single phase DC motor 140 according to the control signal CS until the hall signal Hall_s has the detecting level. For example, with additional reference to FIG. 2, in the first stage, the control signal is configured to control the switches Q1 and Q3 to be on and the switches Q2 and Q4 to be off. The control unit 122 may further be configured to calculate a time interval T1 in which the hall signal Hall_s is in the non-detecting level (e.g., low level).

When the hall signal Hall_s has the detecting level, in step S730, the control unit 122 is configured to drive the driving unit 124 performing in a second stage to control the single phase DC motor 140 according to the control signal CS. Specifically, the control unit 122 is configured to adjust the control signal CS to detect the back electromotive force Vb and to generate the detecting signal Vbs corresponding to the back electromotive force Vb. For example, with additional reference to FIG. 2, in the second stage, the control signal is configured to control the switches Q1 and Q3 to be off and the switches Q2 and Q4 to be on. The control unit 122 may further be configured to calculate a time interval T2 in which the switches Q2 and Q4 are on based on the time interval T1 calculated in the first stage. Due to the fact that during the process of driving the single phase DC motor 140, the back electromotive force Vb is overlaid by other signals, the back electromotive force detecting module 130 is not able to detect the back electromotive force Vb and output a corresponding detecting signal Vbs. Therefore, the control unit 122 is configured to cut off the control signal CS early. That is to say, the time interval T2 in which the corresponding switches are on in the second stage is set to be shorter than the time interval T1 in which the corresponding switches are on in the first stage, and so the back electromotive force detecting module 130 may be configured to detect the back electromotive force Vb and output a corresponding detecting signal Vbs.

In step S735, after a delay interval, the detecting signal Vbs transmitted by the back electromotive force detecting module 130 is not disturbed by the overlay of other signals. Thus, in step S740, the rotation direction of the single phase DC motor 140 after the aforementioned driving process in the first stage and the second stage may once again be determined according to the detecting signal Vbs and the hall signal Hall_s. When the rotation direction of the single phase DC motor 140 is forward, step S750 is performed and a continued forward number is calculated and the continued forward number is implemented by one. Then in the step S755, whether the continued forward number reaches a target value J is determined, in which the target value J may be set to be a predetermined positive integer. If the continued forward number reaches the target value J, it is determined that the dynamic reverse activation has been successful, and the activate process goes back to step S620 to activate the single phase DC motor 140. If the continued forward number does not reach the target value J, step S770 is performed and a detecting number is calculated and implemented by one.

When the rotation direction of the single phase DC motor 140 is reversed, step S760 is performed and the continued forward number is reset to zero. Next, step S770 is performed and the detecting number is calculated and implemented by one.

Regardless of the rotation direction, after the detecting number is calculated when the rotation direction of the single phase dc motor is determined according to the detecting signal Vbs and the hall signal Hall_s in step S770, the control unit 122 is configured to determine whether the detecting number reaches a detecting upper limit K, in which the detecting upper limit K may be set to be a predetermined positive integer not smaller than the target value J. When the detecting number does not reach the detecting upper limit K, steps S710-S775 in the dynamic reverse activation are repeated to determine the rotation direction of the single phase DC motor 140 repeatedly.

When the detecting number reaches the detecting upper limit K, the dynamic reverse activation is determined to have failed and the motor cannot be brought back to the forward direction, after which step S780 is performed. The control unit 122 is configured to deactivate the dynamic reverse mode and start the protection mechanism to protect the single phase DC motor 140 in order to avoid the overcurrent caused by continuous driving. For example, the protection mechanism may be configured to cut off all the switches Q1, Q2, Q3 and Q4, stop providing power to the single phase DC motor 140, wait for a few cycles and then return to the initial state of trying to activate the motor from step S610.

For example, in an embodiment, the target value J of the continued forward number may set to be 8, and the detecting upper limit K may set to be 12, indicating that in the dynamic reverse mode of the present embodiment, if the return air in the system is not too strong and the driving unit 124 successfully brings the single phase DC motor 140 back to the forward direction, when the control unit 122 determines the single phase DC motor 140 is in the forward direction 8 times continuously, the single phase DC motor 140 is successfully activated in the dynamic reverse mode and back to the normal activation process. If the single phase DC motor 140 cannot be in the forward direction 8 times continuously in 12 rotation direction detecting cycles, in situations such as the return air in the system being too strong and the driving unit 124 is not able to bring the single phase DC motor 140 back to the forward direction successfully, or the motor was once brought back to the forward direction after the driving process described above but then was again determined to be in the reverse direction result in the continued forward number resets, the single phase DC motor 140 has not successfully been activated in the dynamic reverse mode. The control unit 122 is then configured to deactivate the dynamic reverse mode, and to start the protection mechanism to protect the single phase DC motor 140 to avoid the overcurrent caused by continuous driving, after which the control unit 122 waits for a few cycles and then returns to the initial state of trying to activate the motor again.

In the present embodiment, the target value J of the continued forward number and the detecting upper limit K may be set according to actual requirements. The driving strategy in the first stage in step S720 and in the second stage in step S730, and the protection mechanism in step S780 may also vary according to actual requirements. For example, in the first stage in step S720, the control signal CS may also be configured to control the switches Q2 and Q4 to be on and the switches Q1 and Q3 to be off, while in the second stage in step S730, the control signal CS may also be configured to control the switches Q1 and Q3 to be on and the switches Q2 and Q4 to be off. In step S780, other protection mechanisms known by one skilled in the art may be applied to prevent the overcurrent, and the aforementioned embodiments are only by examples and not meant to limit the present disclosure.

The above illustrations include exemplary operations, but the operations are not necessarily performed in the order described. The order of the operations disclosed in the present disclosure may be changed, or the operations may even be executed simultaneously or partially simultaneously as appropriate, in accordance with the spirit and scope of various embodiments of the present disclosure.

In summary, in the present disclosure, by applying the embodiments described above and using the characteristics of the back electromotive force together with the hall signal, the rotation direction of the single phase DC motor is determined. In addition, the method of determining the rotation direction of the single phase DC motor is applied in the smart start method of the single phase DC motor to reduce the number of the pins used in the circuit efficiently and improve the issues associated with the existing technology. By applying proper control of the control unit, when the single phase DC motor is in the reverse direction due to the return air, the inner elements are prevented from being burned out by the overcurrent caused by forcibly activating the motor.

Although the disclosure has been described in considerable detail with reference to certain embodiments thereof, it will be understood that the embodiments are not intended to limit the disclosure. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A motor drive circuit, comprising:
   a back electromotive force detecting module electrically connected to a single phase dc motor, and configured to detect a first back electromotive force of the single phase dc motor and to output a first detecting signal correspondingly; and
   a processing module electrically connected to the back electromotive force detecting module and the single phase dc motor, and configured to determine a rotation direction of the single phase dc motor according to the first detecting signal, a reference level, and a hall signal outputted by a hall element disposed in the single phase dc motor, and to control the single phase dc motor,
   wherein the back electromotive force detecting module comprises:
      an input terminal electrically connected to the single phase dc motor;
      an output terminal electrically connected to the processing module, and configured to output the first detecting signal;
      a first diode comprising:
         a first terminal electrically connected to the input terminal of the back electromotive force detecting module; and
         a second terminal;
      a first resistor unit comprising:
         a first terminal electrically connected to the second terminal of the first diode; and
         a second terminal electrically connected to the output terminal of the back electromotive force detecting module; and
      a second resistor unit comprising:
         a first terminal electrically connected to the second terminal of the first resistor unit; and
         a second terminal electrically connected to a voltage source.

2. The motor drive circuit of claim 1, wherein the first detecting signal outputted by the back electromotive force detecting module has a first level corresponding to the first back electromotive force when the first back electromotive force is positive; and
   the first detecting signal outputted by the back electromotive force detecting module has a second level corresponding to the first back electromotive force when the first back electromotive force is negative.

3. The motor drive circuit of claim 1, wherein the back electromotive force detecting module comprises:
   a comparator configured to compare a reference voltage signal with a back electromotive force signal representing the first back electromotive force, and to output the first detecting signal with a corresponding level accordingly.

4. The motor drive circuit of claim 1, wherein the processing module comprises:
   a control unit, wherein when the hall signal outputted by the hall element has a detecting level, the control unit is configured to compare the first detecting signal with the reference level;
   wherein when the level of the first detecting signal is higher than the reference level, the rotation direction of the single phase dc motor is determined to be forward, and when the level of the first detecting signal is lower than the reference level, the rotation direction of the single phase dc motor is determined to be reverse.

5. The motor drive circuit of claim 4, wherein the processing module further comprises:
   a driving unit controlled by the control unit and configured to drive the single phase dc motor selectively according to the rotation direction of the single phase dc motor.

6. A motor drive circuit, comprising:
   a back electromotive force detecting module electrically connected to a single phase dc motor, and configured to detect a first back electromotive force of the single phase dc motor and to output a first detecting signal correspondingly; and
   a processing module electrically connected to the back electromotive force detecting module and the single phase dc motor, and configured to determine a rotation direction of the single phase dc motor according to the first detecting signal, a reference level, and a hall signal outputted by a hall element disposed in the single phase dc motor, and to control the single phase dc motor,
   wherein
      the back electromotive force detecting module is further configured to detect a second back electromotive force of the single phase dc motor and to output a second detecting signal correspondingly;
      the processing module is further configured to determine the rotation direction of the single phase dc motor according to the second detecting signal and to control the single phase dc motor, and the back electromotive force detecting module comprises:
a first input terminal electrically connected to the single phase dc motor, and configured to detect the first back electromotive force;
a second input terminal electrically connected to the single phase dc motor, and configured to detect the second back electromotive force;
a first output terminal electrically connected to the processing module, and configured to output the first detecting signal;
a second output terminal electrically connected to the processing module, and configured to output the second detecting signal;
a first diode comprising:
a first terminal electrically connected to the first input terminal of the back electromotive force detecting module; and
a second terminal;
a first resistor unit comprising:
a first terminal electrically connected to the second terminal of the first diode; and
a second terminal electrically connected to the first output terminal of the back electromotive force detecting module;
a second resistor unit comprising:
a first terminal electrically connected to the second terminal of the first resistor unit; and
a second terminal electrically connected to a voltage source;
a second diode comprising:
a first terminal electrically connected to the second input terminal of the back electromotive force detecting module; and
a second terminal;
a third resistor unit comprising:
a first terminal electrically connected to the second terminal of the second diode; and
a second terminal electrically connected to the second output terminal of the back electromotive force detecting module; and
a fourth resistor unit comprising:
a first terminal electrically connected to the second terminal of the third resistor unit; and
a second terminal electrically connected to the voltage source.

7. The motor drive circuit of claim 6, wherein the processing module comprises:
a control unit, wherein when the hall signal outputted by the hall element has a detecting level, the control unit is configured to compare the first detecting signal and the second detecting signal with the reference level to determine the rotation direction of the single phase dc motor.

8. A method for determining a rotation direction of a single phase dc motor comprising:
detecting a first back electromotive force of the single phase dc motor and outputting a first detecting signal correspondingly;
receiving a hall signal outputted by a hall element disposed in the single phase dc motor;
determining the rotation direction of the single phase dc motor according to the first detecting signal and the hall signal;
determining whether the single phase dc motor is dynamic according to the hall signal;
when the single phase dc motor is determined to be stationary, activating the single phase dc motor directly;
when the single phase dc motor is determined to be dynamic, determining the rotation direction of the single phase dc motor according to the first detecting signal and the hall signal, the first detecting signal corresponding to the first back electromotive force of the single phase dc motor; and
controlling the single phase dc motor according to the rotation direction of the single phase dc motor,
wherein controlling the single phase dc motor comprises:
when the rotation direction of the single phase dc motor is determined to be forward, activating the single phase dc motor directly;
when the rotation direction of the single phase dc motor is determined to be reverse, performing a braking control with respect to the single phase dc motor;
determining whether the single phase dc motor is dynamic after performing the braking control with respect to the single phase dc motor;
when the single phase dc motor is determined to be stationary after performing the braking control, activating the single phase dc motor directly;
when the single phase dc motor is determined to be dynamic after performing the braking control, deactivating the braking control and determining the rotation direction of the single phase dc motor according to the first detecting signal and the hall signal, the first detecting signal corresponding to the first back electromotive force of the single phase dc motor; and
controlling the single phase dc motor according to the rotation direction of the single phase dc motor.

9. The method of claim 8, wherein the step of outputting the first detecting signal further comprises:
outputting the first detecting signal having a first level when the first back electromotive force is positive; and
outputting the first detecting signal having a second level when the first back electromotive force is negative.

10. The method of claim 8, wherein the step of outputting the first detecting signal further comprises:
comparing the first back electromotive force and a reference voltage signal;
outputting the first detecting signal having a first level when the first back electromotive force is higher than the reference voltage signal; and
outputting the first detecting signal having a second level when the first back electromotive force is lower than the reference voltage signal.

11. The method of claim 8, further comprising:
detecting a second back electromotive force of the single phase dc motor and outputting a second detecting signal correspondingly;
determining the rotation direction of the single phase dc motor according to the second detecting signal and the hall signal.

12. The method of claim 8, wherein the step of controlling the single phase dc motor further comprises:
when the rotation direction of the single phase dc motor is determined to be forward after the braking control is deactivated, activating the single phase dc motor.

13. The method of claim 12, wherein when the rotation direction of the single phase dc motor is determined to be reverse after the braking control is deactivated, controlling the single phase dc motor in a dynamic reverse mode, wherein in the dynamic reverse mode the method further comprises:

driving a driving unit in a first stage to control the single phase dc motor until the hall signal has a detecting level according to a control signal.

14. The method of claim 13, wherein when the hall signal has the detecting level, wherein in the dynamic reverse mode the method further comprises:

driving the driving unit in a second stage to control the single phase dc motor according to the control signal;

determining the rotation direction of the single phase dc motor according to the first detecting signal and the hall signal;

when the rotation direction of the single phase dc motor is determined to be forward, calculating a continued forward number, and when the continued forward number reaches a target value, deactivating the dynamic reverse mode and activate the single phase dc motor;

when the rotation direction of the single phase dc motor is determined to be reverse, resetting the continued forward number to be zero.

15. The method of claim 14, wherein driving the driving unit in the second stage comprises:

adjusting the control signal to detect the first back electromotive force; and     generating the first detecting signal corresponding to the first back electromotive force.

16. The method of claim 14, wherein in the dynamic reverse mode the method further comprises:

calculating a detecting number when the rotation direction of the single phase dc motor is determined according to the first detecting signal and the hall signal;

when the detecting number reaches a detecting upper limit, deactivating the dynamic reverse mode to protect the single phase dc motor.

\* \* \* \* \*